United States Patent [19]
Vigil

[11] Patent Number: 5,240,031
[45] Date of Patent: Aug. 31, 1993

[54] INFLATABLE BLADDER VALVE FOR IRRIGATION PIPE

[76] Inventor: David J. Vigil, Rte. 1, Box 140A, Worland, Wyo. 82604

[21] Appl. No.: 973,717

[22] Filed: Nov. 9, 1992

[51] Int. Cl.$^5$ .................... F16K 7/10; F16L 55/136
[52] U.S. Cl. ...................................... 137/315; 138/93
[58] Field of Search ............... 137/225, 226, 227, 228, 137/230, 315, 319, 320; 138/89, 93; 251/5, 61.1; 405/36, 37

[56] References Cited

U.S. PATENT DOCUMENTS

| | | | |
|---|---|---|---|
| 1,814,677 | 7/1931 | Fennema | 138/93 |
| 1,906,151 | 4/1933 | Goodman | 138/93 |
| 2,279,257 | 4/1942 | Svirsky | 138/93 |
| 2,753,876 | 7/1956 | Kurt | 138/93 |
| 2,843,154 | 7/1958 | Hosking | 138/93 |
| 3,320,750 | 5/1967 | Haise et al. | 138/93 |
| 3,564,103 | 2/1971 | Brachschob | 138/93 |
| 4,144,908 | 3/1979 | Dunn | 138/93 |
| 4,203,473 | 5/1980 | Roberson, Sr. | 138/93 |
| 4,565,222 | 1/1986 | Lundman | 138/93 |
| 4,964,439 | 10/1990 | Vanderlans | 138/93 |

FOREIGN PATENT DOCUMENTS

| | | | |
|---|---|---|---|
| 504392 | 8/1930 | Fed. Rep. of Germany | 138/93 |
| 2363664 | 7/1975 | Fed. Rep. of Germany | 138/93 |
| 20301 | 9/1906 | United Kingdom | 138/93 |
| 188695 | 11/1922 | United Kingdom | 138/93 |

*Primary Examiner*—George L. Walton
*Attorney, Agent, or Firm*—Risto A. Rinne, Jr.; Douglas M. Clarkson

[57] ABSTRACT

An inflatable bladder type valve that is used to restrict the flow of water passing through an irrigation pipe is described for insertion through a standard size opening or through an enlarged opening in an irrigation pipe. Means to convey a fluid, such as air, under pressure to the bladder type valve and an air release valve for limiting the air pressure are described. Means to secure the bladder type valve in position include a reinforced hook attached to a hose, a tapered wedge attached to a hose, and a high friction surface on the valve. A covering is placed over the bladder to restrict the dimensions of the bladder when it is inflated. A taped plug is described for restricting the flow of water through the enlarged opening when the valve is removed.

5 Claims, 2 Drawing Sheets

INFLATABLE BLADDER VALVE FOR IRRIGATION PIPE

BACKGROUND OF THE INVENTION

1. Field of the Invention

The present invention, in general, relates to apparatus used with irrigation pipe and, more particularly, to devices that function as valves to control the flow of water through such types of pipe.

Irrigation pipe consists of various lengths and diameters of pipe and pipe fittings, each of which are connected together in a myriad of possible ways in order to satisfy the particular irrigation requirements of the area in which they are being used. The most common materials used to fabricate irrigation pipe are PVC and aluminum, although other types of material are also used on occasion.

Certain common types of irrigation pipe and pipe fittings interconnect with each other by having one end of each pipe or pipe fitting slip into a corresponding bell shaped enlarged portion of the remaining end thereof and by having a gasket located therein. Other types of irrigation pipe and pipe fittings utilize clamping arrangements that secure each of the gated pipes or pipe fittings together.

One characteristic common with most types of irrigation pipe is to have openings that are located at spaced apart intervals along the length of each section of irrigation pipe. Such types of irrigation pipe are commonly referred to as "gated" irrigation pipe.

Each of the openings is referred to as a "gate", hence the reason for referring to it as "gated pipe". Each gate typically utilizes a sliding or pivoting means to proportionally control the opening size. Each gate opening is either closed or is opened to an extent that determines the amount of water that is desired to be released therefrom.

Gated irrigation pipe greatly conserves water by depositing it in smaller amounts and in closer proximity to where it is required than by general flood irrigation methods.

It is, however, necessary to diminish or even to interrupt the flow of water entirely that is passing through certain sections of pipe. Typically, "butterfly" or "gate" types of valves are inserted as an adjunct fitting between sections of gated pipe when the gated pipe is assembled together.

These types of valves are expensive, and consequently few are incorporated into gated pipe systems except where thought to be absolutely necessary. As such there are often many locations along each "run", a run being a plurality of sections of irrigation pipe connected together, that stand to benefit from the use of gated pipe valves but, due to their high cost, are presently denied any such benefit.

Furthermore butterfly and gate valves for use with irrigation pipe are, as hereinbefore mentioned, inserted between the sections of pipe and fittings during assembly of those components together. If, after use, it is determined that a particular valve is needed elsewhere, it is then necessary to disassemble virtually all of the sections of irrigation pipe and fittings that are located between the existing and the desire valve locations, move the valve, and to then reassemble all of the sections together again.

In lieu of having either a sufficient quantity of valves located where needed or of moving a lesser number of valves from place to place, the individual gates that are present on gated irrigation pipe are grouped together with each group having a certain number of gates therein. Each group of gates is periodically opened a proportional amount to allow for the desired quantity of water to flow therefrom while all other groups of gates are simultaneously closed.

The quantity of water that is available is usually the factor that determines the number of gates to be contained within each grouping as well as the proportion to which each individual gate is to be opened. Each grouping is more commonly referred to as a "set".

After one set has finished supplying the desired quantity of irrigation to a particular area, each of the individual gates of that set are closed and all of the gates of another set are opened in proportion to the quantity of water that is desired to flow therefrom. The process of opening and closing the individual gates of each set is repeated continually during the course of the growing season. Such a practice, although common, is time consuming and is therefore also expensive of its own right.

Having a sufficient quantity of valves located so as to separate one set from each other set allows for an irrigator to proportionally open each of the gates as desired, usually only one time during each growing season. Initially, all of the valves are opened and water is allowed to flow through the gated pipe. Water will flow to the end of all of the sections of irrigation pipe and will begin to flow out from the gates that are located towards the end of the gated pipe sections.

Water that is flowing into the gated pipe will eventually establish equilibrium with the water that is flowing out of the gates. This occurs when the flow of water entering into the gated pipe equals the quantity of water that is flowing out from the gates. Ideally a valve is located immediately upstream from the last gate that is releasing water, thereby forming the first of several sets.

After a time has passed and irrigation of the first downstream set has been accomplished the valve that is located immediately above that particular set is closed thereby repeating the process whereby water will now flow from a second set of gates located immediately upstream from the valve. There is no requirement to close the individual downstream gates as no significant quantity water is allowed to flow beyond the closed valve. This process is repeated, merely by closing valves to enable new sets, until all of the irrigation sets are accomplished.

To repeat the cycle all of the valves are opened and the irrigation cycle begins again with the most downstream set. The primary savings gained by having a plurality of valves separating each set from every other set is a savings of time by not having to proportionately open and close each gate repeatedly. But due to the high cost of valves and the difficulty of moving them from place to place as needed, most gated pipe systems suffer from a shortage of valves and therefore require the repeated opening and closing of many individual gates.

Accordingly there exists today a need for a valve for use with irrigation pipe that may be readily moved from one section of pipe to another without requiring the dismantling of irrigation pipe sections.

2. Description of Prior Art

Valves for irrigation pipe are known. Butterfly and gate types of valves are presently in common use with irrigation pipe systems. Inflatable bladder type valves are also known but are not hereinbefore known for insertion through gate openings that are present on gated irrigation pipe or through other openings formed in the perimeter along the length of irrigation pipe.

For example, U.S. Pat. No. 2,598,207 to E. G. Bailey et al., that issued May 27, 1952, describes a valving apparatus for regulating the flow of a fluid through a conduit having an expansive member clamped to the wall of the conduit.

White U.S. Pat. No. 2,989,282 that issued Jun. 20, 1961, describes a diaphragm type of irrigation valve.

U.S. Pat. No. 3,022,977 to Jones, that issued Feb. 27, 1992, describes a vacuum operated normally closed valve.

U.S. Pat. No. 3,320,750 to Haise et al., that issued May 23, 1967, describes a remote control irrigation system having an inflatable bag that is fixedly clamped in place within a conduit.

U.S. Pat. No. 3,556,139 to Moslovskaya et al., that issued Jan. 19, 1971, describes a shutoff valve for hydraulic systems with high temperature aggressive media for use mainly in atomic and other power plants.

U.S. Pat. No. 4,182,371 to Moore, that issued Jan. 8, 1980 describes an automated control device or valve having an expandable bladder which controls the flow of fluid through a supply line or stops the flow after a predetermined amount of liquid has passed through the valve.

U.S. Pat. No. 4,785,841 to Breckner, that issued Nov. 22, 1988, describes a self clearing bladder valve.

While the structural arrangements of the above described devices, at first appearance, have similarities with the present invention, they differ in material respects. These differences, which will be described in more detail hereinafter, are essential for the effective use of the invention and which admit of the advantages that are not available with the prior devices.

OBJECTS AND SUMMARY OF THE INVENTION

It is an important object of the present invention to provide a bladder type of valve for use with irrigation pipe that may be inserted in through a desired open gate, inflated to regulate the flow of water therein for as long as is desired, and then deflated and removed from the gate that it was originally inserted in.

It is also an object of the invention to provide a bladder type valve for use with irrigation pipe that is readily portable from one location to another.

Still another object of the invention is to provide a bladder valve for use with gated irrigation pipe and other types of water transmission pipe that is adapted for use in special enlarged openings that are provided for that purpose where desired in the perimeter along the length of irrigation pipe.

Briefly, an inflatable bladder-type valve apparatus for use with gated and other types of irrigation pipe that is constructed in accordance with the principles of the present invention has an inflatable bladder connected by a hose to an air intake and an air release valve assembly. A reinforced hooked portion of the hose secures the valve in position. An enlarged wedge portion is fixedly secured to the hose, according to a modification, to prevent the air intake and an air release valve assembly portion of the bladder valve from entering into the pipe. A flexible covering, according to a modification, is used to restrict the size, shape, and to establish the static coefficient of friction of the inflated valve within the pipe. An expandable plug is described for use to prevent water from flowing out of special enlarged openings.

DETAILED DESCRIPTION OF THE INVENTION

Figure 1:
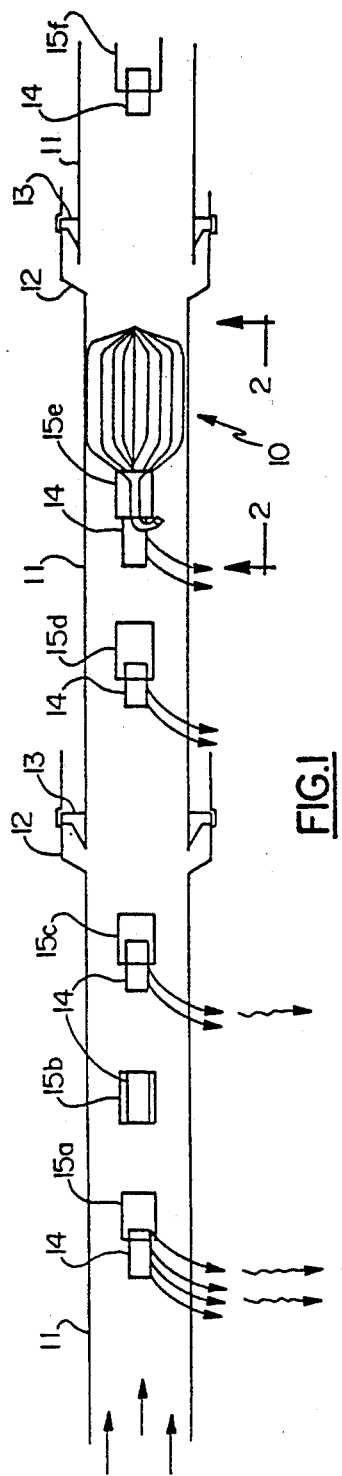
FIG. 1 is a cross sectional view of a plurality of interconnected sections of gated irrigation pipe with an inflatable bladder-type valve for use with irrigation pipe located therein.

Referring to FIG. 1 is shown, a bladder valve for use with gated irrigation pipe, identified in general by the numeral 10. The inflated valve 10 is located inside one of three typical gated pipe 11 sections.

One end of each section of gated pipe 11 slides into an enlarged bell housing 12 that is formed at the remaining end of each gated pipe 11 section. A rubber gasket seal 13 located therein provides a substantially watertight seal between each of the gated pipe 11 sections. Pipe fittings, such as elbows (not shown), "T" fittings (not shown), gate valves (not shown), and the like, connect together in a similar manner.

Certain other types of irritation pipe (not shown) interconnect by alternative methods such as by clamps. Regardless of how the gated pipe 11 sections are fastened together, the bladder valve 10 is usable providing access to the inside of the pipe 11 is provided by either a standard gate opening 14 or by a special enlarged opening (not shown) that is formed somewhere along the length of the pipe 11. The use of the special enlarged opening is described in greater detail hereinafter.

A plurality of standard gate openings 14 are shown, along with a sliding gate 15a, 15b, 15c, 15d, 15e, 15f, that is attached to each of the standard gate openings 14. Water is assumed to be flowing within the pipe 11 from left to right in direction. The first sliding gate 15a is fully open and an abundant quantity of water is shown flowing therefrom, as represented by the arrows. The second gate 15b is closed and no water is flowing therefrom. The third gate 15c, and fourth gate 15d are each partially open permitting a more limited quantity of water to flow therefrom.

The fifth gate 15e is fully open and the bladder valve 10 has already been inserted thereinto and fully inflated. A limited quantity of water is flowing out from the gate opening 14 of the fifth gate 15e.

The valve 10, when inflated, provides an effective seal where it is placed within the gated pipe 11, and as such no significant quantity of water is allowed to flow thereafter. Accordingly a sixth gate 15f is shown in the partially open position, yet no water is flowing therefrom.

Figure 2:
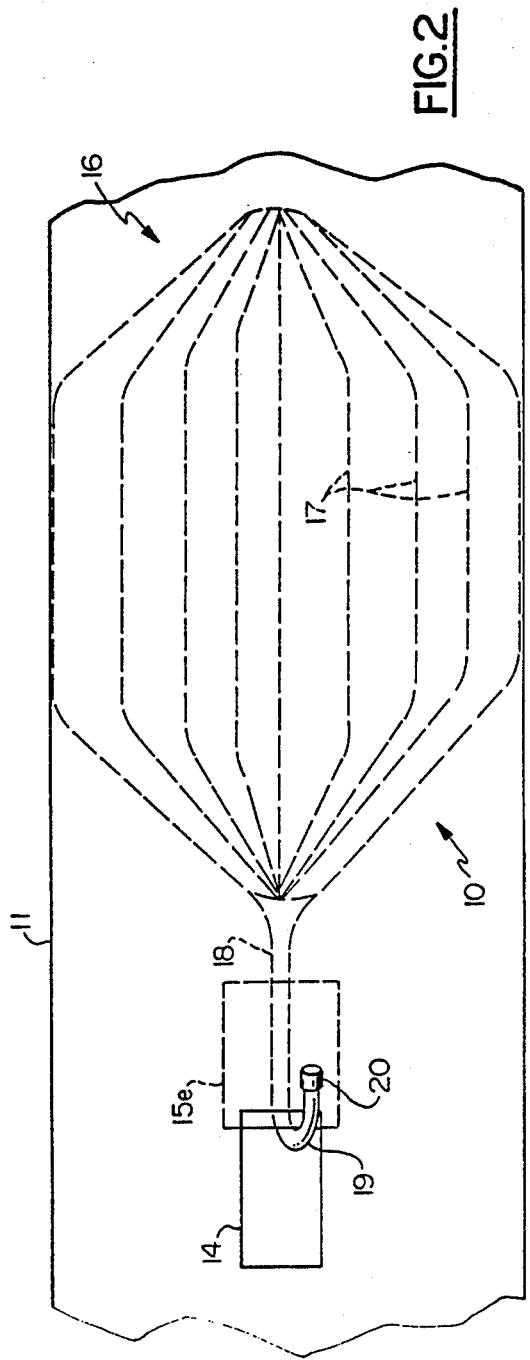
FIG. 2 is a cross sectional view taken on the line 2—2 in FIG. 1.
Figure 3:
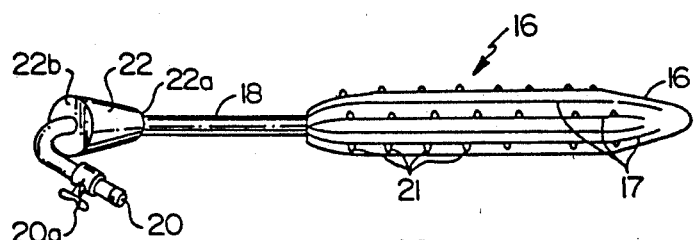
FIG. 3 is a view in perspective of a modified preferred form of inflatable bladder valve for use with irrigation pipe shown in a deflated state.

Referring also to FIG. 2 and on occasion to FIG. 3 the bladder valve 10 consists of a main body, identified in general by the numeral 16. The main body 16 is formed of a suitable elastomeric material such as of rubber and in such a way as to provide pleats 17 which extend longitudinally the length of the main body 16. The purpose of the pleats 17 is to allow the main body 16 of the bladder valve 10 to compress together so as to provide a smaller cross-sectional area for the main body 16 than would be otherwise possible without the pleats 17, thereby making insertion and removal of the main body 16 easier to accomplish through the gate openings 14.

The pleats 17 are a preferred method for the construction for the main body 16 when the access space into the interior of the gate pipe 11 is limited. This is often the situation that is encountered when the main body 16 is inserted in through standard sized gate openings 14.

The pleats 17, in a modification, are omitted from the main body 16 and, as such, the main body 16 is somewhat harder to insert in through and to remove from the gate openings 14. To better accommodate the use of a main body without having pleats 17 formed therein, a special enlarged opening (not shown), as hereinbefore mentioned, is provided and is described in greater detail hereinafter.

A length of hose 18 is attached to the body 16 at one end and to a reinforced hook 19 (FIG. 2) at the remaining end thereof. The hook 19 is formed in a curved shape and is constructed of a substantially rigid tubular reinforced material such as of a hollow curved metallic pipe.

The hook 19 is attached at its remaining end to an air valve 20. The air valve 20 is constructed similar to the valve stems (not shown) that are commonly used to supply air to, or to bleed air from, an automobile tire (not shown).

To use the valve 10 as shown in FIG. 1, the fifth gate 15e is opened fully. Water will begin to flow out from the open fifth gate 15e, providing that water is already flowing through the gated pipe 11 in that area. The deflated valve 10 is inserted into the gated pipe 11 by pushing the compressed main body 16 in through the gate opening 14 of the open fifth gate 15e. The hook 19 serves as a method to prevent the main body 16 from being carried "downstream" along the inside of the gated pipe 11 by water flowing therein.

A source of compressed air (not shown) is applied to the air valve 20 and is used to inflate the main body 16 of the valve 10. The pressure is checked by a gauge (not shown) and is adjusted as desired either by supplying more air to the air valve 20 or by bleeding air out from the air valve 20.

As an alternative to bleeding air out from the air valve 20, a pressure relief valve 20a (FIG. 3) is attached to either the hose 18 or to the air valve 20 according to a modification. The pressure relief valve 20a automatically bleeds off excess air when the air pressure within the valve 10 exceeds a predetermined pressure.

It is desirable to not over-inflate the valve 10 in order to prevent damage from occurring to either the valve 10 or to the pipe 11. The pressure relief valve 20a is one method used to prevent a condition of over-inflation from occurring.

If water were not already flowing in the gated pipe 11, the flow would then be initiated. When the irrigation "set" is completed, the valve 10 is deflated by bleeding all of the compressed air from the valve 20 and is then removed from the fifth gate 15e for use elsewhere in a manner similar to that as hereinabove described.

Referring to FIG. 3, protrusions 21 are formed on the exterior surface of the main body 16 as a method that is used to increase the static friction arising between the main body 16 and the inside surface of the gated pipe 11 when the valve 10 is inflated.

A wedge 22 is a modification that is used to secure the valve 10 in position where desired within the gated pipe 11 against the flow of water occurring therein. The wedge 22 is fixedly attached to the hose 18 and is constructed with a taper so as to permit the nose 22a of the wedge 22 to enter into the gate opening (gate opening not shown in FIG. 3).

The nose 22a and a portion of the rest of the wedge 22 enter into the gate opening but are prevented from passing through the gate opening by an enlarged base 22b portion of the wedge 22. The enlarged base 22b must be of a cross sectional dimension that is larger than that of the gate opening to prevent the wedge 22 from entering fully into the gated pipe 11.

The enlarged base 22b and nose 22a of the wedge 22 may be either round, square, rectangular, or that generally of any other polygonal in cross-sectional shape to suit the particular shape of gate opening 14.

While it is preferred that the nose 22a be smaller than the enlarged base 22b, the nose is, according to one variation, constructed larger in cross-section than the gate opening 14. If the nose 22a is larger than the gate opening 14, then no portion of the wedge 22 is able to enter into the gate opening 14. In that instance the wedge 22 acts simply as a stopper (not shown) to block the valve 10 from being drawn into the pipe 11 by the force of the water flowing therein.

It is possible to eliminate both the hook 19 (FIG. 2) and the wedge 22 (FIG. 3) from the valve 10 and still secure the valve 10 in position within the pipe 11 merely by relying upon the static friction arising between the main body 16 and the inside of the gated pipe 11 when the valve 10 is inflated. However, this is not a preferred form of construction for the valve 10 when the valve 10 is inserted into the pipe 11 while a substantial flow of water is occurring therein.

The wedge 22 is typically constructed in a generally round cone shape (as shown) for use with round gate openings (not shown) or in a generally rectangular pyramid shape (not shown) for use with rectangular gate openings 14. The wedge 22 has the additional advantage of functioning as a plug thereby restricting the flow of water emanating from the gate opening through which the valve 10 is inserted.

Figure 4:
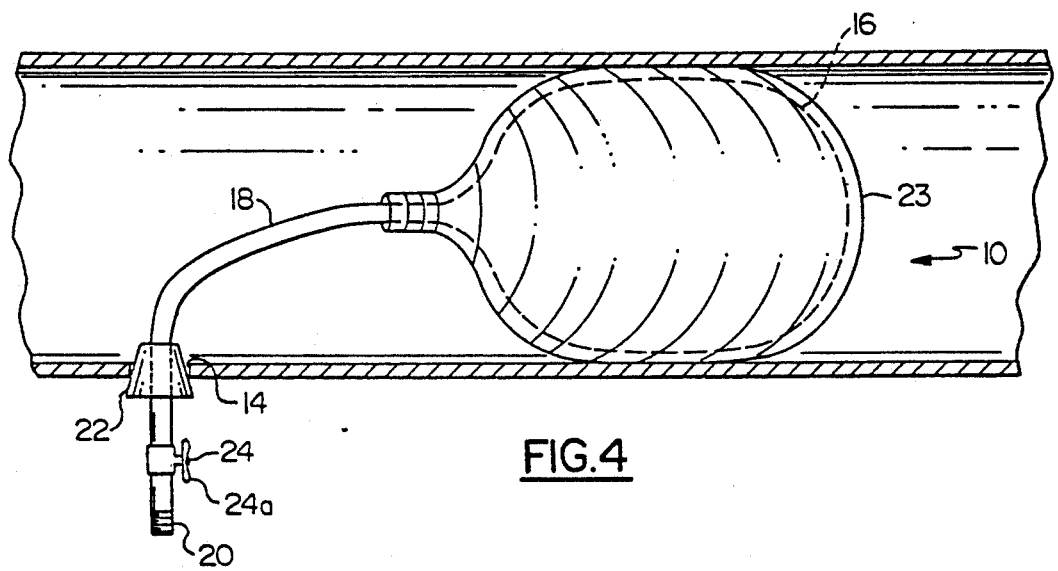
FIG. 4 is a cross sectional view of another preferred form of inflatable bladder valve for use with irrigation pipe.

Referring to FIG. 4 is shown a modified form of inflatable bladder valve 10 for use with irrigation pipe 11. An elastic main body 16 is constructed, as hereinbefore described, either with or without pleats (not shown) and is housed within a flexible covering hereinbelow referred to as a sock 23. The sock 23 is flexible so that it may be folded over itself with the main body 16 situated therein for entry into the gate opening 14 or for withdrawal therefrom.

A wedge 22, is shown as the modification of choice selected to secure the valve 10 is position, is fixedly attached to the hose 18. An air valve 20 is attached adjacent to a bleeder valve 24. The bleeder valve 24 is a modification that is suitable for use with all of the described forms of the inflatable bladder valve 10. The bleeder valve 24 contains a wing nut 24a that is opened to allow for air to escape from the valve 10 and is closed to retain air in the valve 10.

The sock 23 is constructed of flexible yet substantially inelastic material that limits the maximum size that the main body 16 attains during inflation. Unless a significant condition of over-inflation occurs whereby the sock 23 is itself ruptured, the sock normally serves to effectively contain the maximum overall size and shape of the main body 16 when it is inflated.

As such the sock 23 allows for less critical monitoring of the air pressure that the valve 10 is inflated to. A greater range of inflation pressures are thus permitted whilst still ensuring that the valve 10 will provide both a tight seal against the interior surface of the gated pipe 11 and not cause damage to the pipe 11 by a modest over-inflation of the valve 10.

The sock 23 also provides a predetermined method of controlling the static friction between the valve 10 and pipe 11 interior. The sock 23 limits expansion of the main body 16 in all directions including longitudinally within the pipe 11. As such it is possible to accurately determine in advance the area of contact occuring between the sock 23 and the inside surface of the pipe 11 when the valve 10 is inflated.

By selecting a material with a desired coefficient of static friction for construction of the sock 23, a method of controlling static friction over a wide range of inflation pressures is thereby obtained. While canvas is one such preferred material that is used for the construction of the sock 23, other types of flexible materials are used as well.

Different sizes of socks 23 are, of course, required for use with different diameters of pipe 11. Valves 10 which rely upon a sock 23 are typically selected for use specifically with either six inch, eight inch, ten inch, twelve inch, etc., diameter pipes 11 as needed. A valve 10 having a six inch diameter sock 23 would not hold securely in a ten inch diameter pipe. Conversely a valve 10 having a ten inch diameter sock 23, if inserted in a six inch diameter pipe 11, would risk causing damage to the pipe 11 by possibly rupturing or otherwise deforming the pipe 11 when inflated.

Any of the valves 10, when inflated fully, provides a substantial seal to block the flow of water occuring inside a pipe 11. Similarly any of the valves 10, if partially inflated, provides a proportional restriction thereby limiting the flow of water passing through the pipe 11 and beyond the partially inflated valve 11 as desired. When a valve 10 is only partially inflated, there is little, if any, static friction occurring between the valve 10 and the inside of the pipe 11. Valves 10 which are to be partially inflated must, therefore, be retained in position by the use of either the hook 19 or the wedge 22.

For certain sections of gated pipe 11 where it is known that the inflatable bladder valve 10 will be used frequently, a modification is made to the wedge 22 to increase its size. A special enlarged opening (not shown) is provided in the pipe 11 by either enlarging one of the gate openings 14 or by creating a new opening for use in accommodating an enlarged wedge (not shown). The enlarged wedge is constructed as desired either round, square, rectangular, or of some other generally polygonal shape similar to the wedge 22 hereinbefore described, only larger.

The reason for providing a special enlarged opening is to allow for easier insertion and removal of the main body 16 than would otherwise be possible through a standard gate opening 14 in areas where frequent insertion and removal of the valve 10 is anticipated.

Also, certain sections of irrigation feed pipe (not shown) do not have any gate openings 14 formed therein. The irrigation feed pipe is used primarily to convey water over areas where direct irrigation is not anticipated. The irrigation feed pipe returns to standard sections of gated pipe 11 when a portion of land that is in need of irrigation is reached.

It is, on occasion desirable, to be able to insert a valve 10 into the irrigation feed pipe to restrict the flow of water therein. As no gate openings 14 exist in such types of feed pipe, a special enlarged opening is formed where desired along the length of feed pipe. Accordingly, a correspondingly shaped enlarged wedge is attached to the valve 10 to prevent the complete entry of the enlarged wedge through the special enlarged opening and into the gated pipe 11 or into the irrigation feed pipe.

When the valve 10 is removed from a standard gate opening 14, the appropriate gate 15e (FIG. 2) is simply closed to stop the flow of water therefrom. Occasionally, when a special enlarged opening is provided and the valve 10 is removed therefrom, it is also necessary to stop the flow of water from occurring through the now vacant special enlarged opening.

Figure 5:
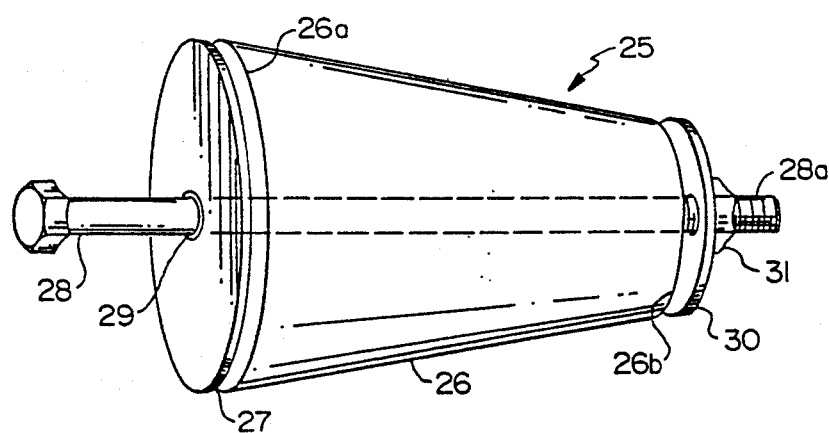
FIG. 5 is a view in perspective of a plug used for sealing an opening formed in an irrigation pipe.

Referring to FIG. 5 is shown a gate opening plug identified in general by the numeral 25. The gate opening plug 25 is constructed of a solid block 26 of deformable elastomeric material, such as of rubber, and having a taper similar to that of the wedge 22 (FIG. 4), only less severe. The taper, as shown in FIG. 5 of the block 26, is exaggerated for purpose of clarity.

The actual taper of the block 26 is slight so as to provide sufficient clearance for the smaller diameter end 26b of the block 26 to enter in through the special enlarged opening. The block 26 of the gate opening plug 25 is otherwise constructed similar in size and shape to that of the enlarged wedge for which it is designed to be used in place of when the valve 10 is removed.

A large end plate 27 is constructed of rigid material such as of steel plate and is secured in position adjacent to the larger diameter end 26a of the block 26 by a bolt 28 passing through a center clearance opening 29 of the large end plate 27 provided therein. A small end plate 30 is constructed of rigid material such as of steel plate and is secured in position adjacent to the smaller diameter end 26b of the block 26 by the bolt 28 passing through a similar center clearance opening (not shown) of the small end plate 30.

A nut 31 is attached to the small end plate 30 about the clearance opening therein provided. The threads 28a of the bolt 28 engage the threads (not shown) of the nut 31.

The gate opening plug 25 is inserted partially in through the special enlarged opening provided after the valve 10 has been removed therefrom. The bolt 28 is tightened which draws the small end plate 30 in towards the large end plate 27 compressing the block 26 therein. The compression of the block 26, in turn, forces the center portion of the block 26 to swell thereby increasing its effective dimensions. The swelling of the center portion of the block 26 bears against the special enlarged opening thus securing the gate opening plug 25 in position within the special enlarged opening and preventing the flow of water from occuring therefrom.

To remove the gate opening plug 25 from the special enlarged opening, the bolt 28 is loosened and the plug 25 is removed. While only one bolt 28 is shown, a plurality of bolts (not shown) are used in certain types of gate opening plugs (not shown) for use in especially large special openings (not shown).

The invention has been shown, described and illustrated in substantial detail with reference to the presently preferred embodiment. It will be understood by those skilled in this art that other and further changes and modifications may be made without departing from the spirit and scope of the invention which is defined by the claims appended hereto.

What is claimed is:

1. An inflatable bladder type valve for insertion in, and withdrawal from, a gated opening in a predetermined location along the length of an irrigation pipe having a plurality of such gated openings with a plurality of gate valve means for opening and closing said gated openings, said inflatable bladder type valve comprising:

bladder means having pleats arranged in a predetermined configuration, said bladder means being formed of a predetermined flexible material having a high friction surface with protrusions extending from said bladder means for securing said bladder means by friction in a predetermined position and formed in a preselected inflatable configuration with a covering to limit the dimensions of said bladder means with said irrigation pipe;

first means connected to said bladder means to convey air under pressure;

second means connected with said first means including combined air intake and exhaust means to control the flow of said air under pressure; and third means including a hook attached to said first means connected to said bladder means to selectively engage at least one of said gated openings when its gate valve means has moved to an open position for securing said bladder means in said predetermined position relative to said at least one of said gated openings when said bladder means is inserted within said irrigation pipe.

2. The inflatable bladder type valve of claim 1 wherein said flexible material includes a predetermined fabric.

3. The inflatable bladder type valve of claim 1 wherein said third means for securing said bladder means includes wedge means fixedly attached to said first means, whereby said wedge means is substantially larger on at least one end than said at least one of said gated openings to prevent a complete entry of said wedge means into said at least one said gated openings.

4. The inflatable bladder type valve of claim 3 wherein said wedge means is comprised of a predetermined shape and size to seal said at least one of said gated openings.

5. The inflatable bladder type valve of claim 1 wherein said predetermined configuration of said pleats is longitudinal in the same direction as a length of said irrigation pipe to facilitate passing said valve through said at least one of said gated openings in said irrigation pipe.

* * * * *